United States Patent [19]

Di Bello

[11] 3,837,492

[45] Sept. 24, 1974

[54] ROTATING FILTER FOR WASTEWATER BIOLOGICAL PURIFICATION

[76] Inventor: Carmine Di Bello, Via Negroponte 11-Lido, Lido Venezia, Italy

[22] Filed: Dec. 22, 1972

[21] Appl. No.: 317,787

[30] Foreign Application Priority Data
July 11, 1972 Italy..........................84132-A/72

[52] U.S. Cl.................. 210/150, 210/330, 210/345
[51] Int. Cl............................................ B01d 25/00
[58] Field of Search ............ 210/330, 338, 17, 320; 261/83, 84

[56] References Cited
UNITED STATES PATENTS
3,283,482  11/1966  Trafford et al. ...................... 261/83
3,389,798  6/1968  Hartmann et al. ..................... 210/17

Primary Examiner—Frank A. Spear, Jr.
Assistant Examiner—Ferris H. Lander
Attorney, Agent, or Firm—Cushman, Darby & Cushman

[57] ABSTRACT

The invention relates to a rotating filter for wastewater biological purification. The filter comprises at least one pack of parallel channels that are open at their extremities. The pack is rotated in the direction of development of the channels, so that it is periodically in contact with the wastewater and then with the atmospheric oxygen. As a consequence of this construction of the filter, its purifying capability is improved greatly.

3 Claims, 10 Drawing Figures

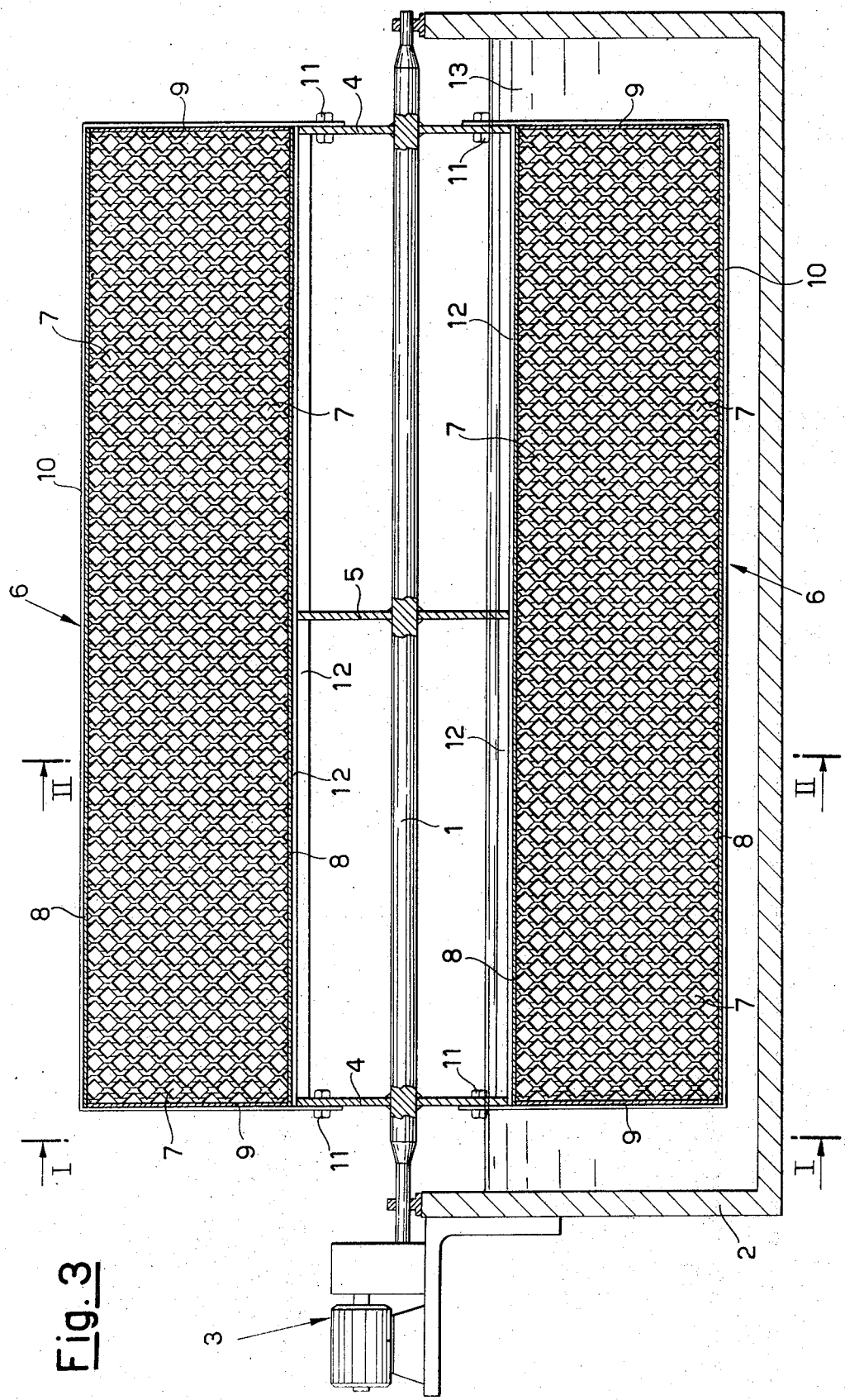

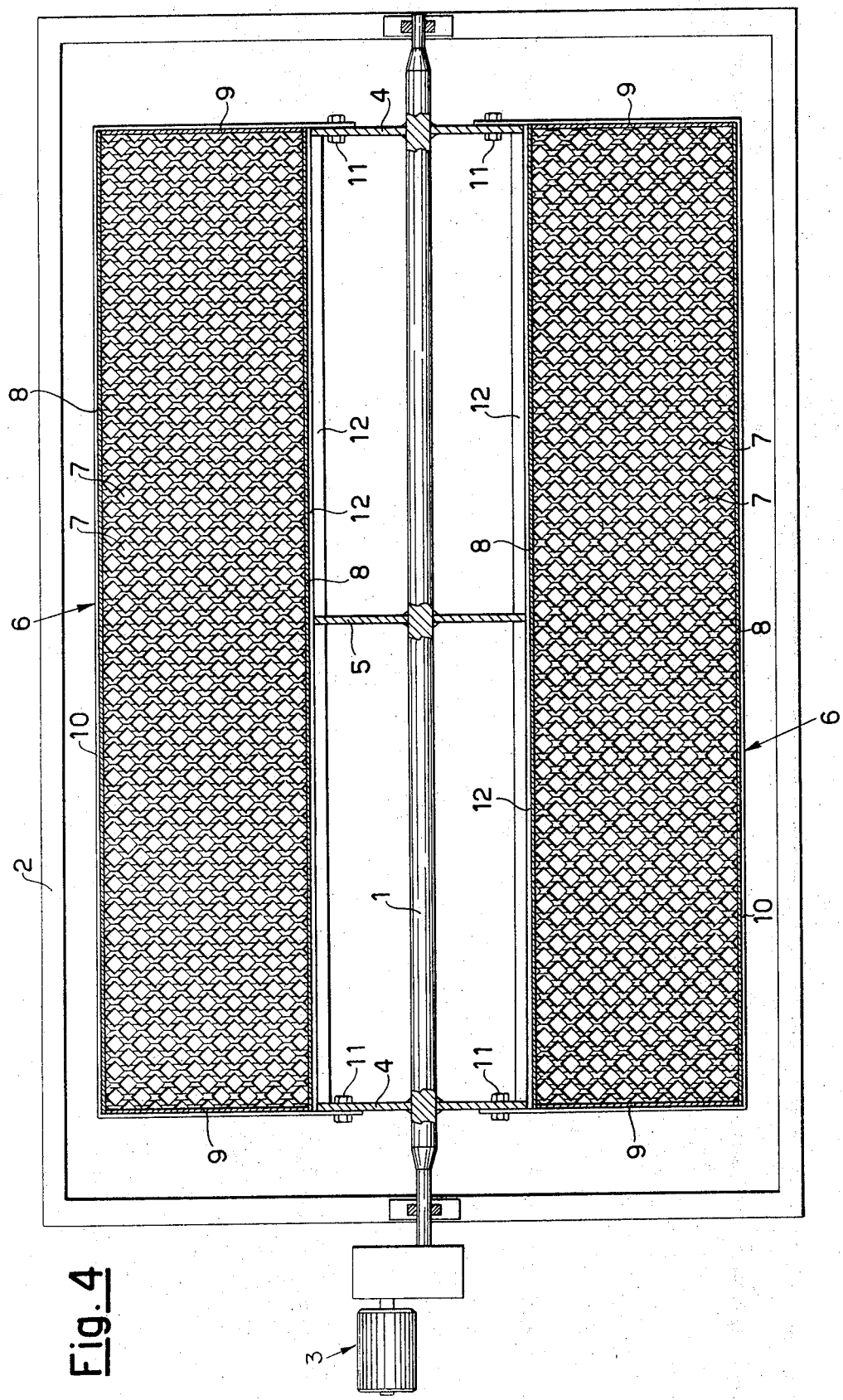

ROTATING FILTER FOR WASTEWATER BIOLOGICAL PURIFICATION

The present invention relates to a rotating filter for waste-water biological purification.

It is well known that one of the systems used for wastewater biological purification consists in a filter rotating periodically, first into contact with the wastewater, and then into contact with the atmospheric oxygen.

A biological film develops on the surfaces of the filter. When the filter rotates submerged in the wastewater, the biological film absorbs the organic pollutants present in the same wastewater. When the filter rotates out of the wastewater, the organic pollutants, absorbed by the biological film, are exposed to the oxygen in the air. The natural oxidation transforms the organic pollutants into metabolic products.

As the biological film grows, the excess of the film continuously sloughs off the surfaces of the filter, falling by gravity in the bottom of the tank.

The object of this invention is to realize a rotating filter of the above-mentioned type, which has improved functionality, purifying capability, and ease of construction and which is compact and has low operating and maintenance costs.

According to the invention, this object is obtained by means of a rotating filter characterized by having at least one pack of parallel channels that are open at their extremities, thereby permitting a free entrance and a free egress of the wastewater and of the atmospheric oxygen, the axis of rotation of the assembly being perpendicular to the channels.

The openings of the channels are at opposite ends of the channels. The pack rotates in the direction corresponding to the development of the channels in such a way that the same channels are, at each revolution of the filter, periodically moved into contact with the wastewater, and then into contact with the oxygen in the air.

As a result of the special disposition of the channels relative to the direction of the filter's rotation, a forced circulation of the wastewater and of the oxygen through the same channels ensues, thereby promoting both the continuous biodegradation of the organic polluting matter and the continuous reproduction of the film.

The purifying capability of the rotating filter is further enhanced since the film covers a very large surface area (the whole wall area of the channels), while the clogging of the channels is prevented since free-fall of the excess of the bio-oxidized products as sludge under the force of gravity is allowed. Furthermore, the special geometry and position of the channels in the filter prevent every possibility that a certain quantity of wastewater flows out the tank without a suitable action of the filter.

Other benefits of the above-mentioned filter are: ease of construction, short start-up time, a great deal of flexibility, and low operating and maintenance costs.

The characteristics of the present invention will be better understood after the examination of the filter as detailed in the enclosed drawings, where:

FIG. 3 shows the cross-section of the above-mentioned filter, according to the line III—III of FIG. 1.

FIG. 4 shows the cross-section of the above-mentioned filter, according to the line IV—IV of FIG. 1.

Figure 1:
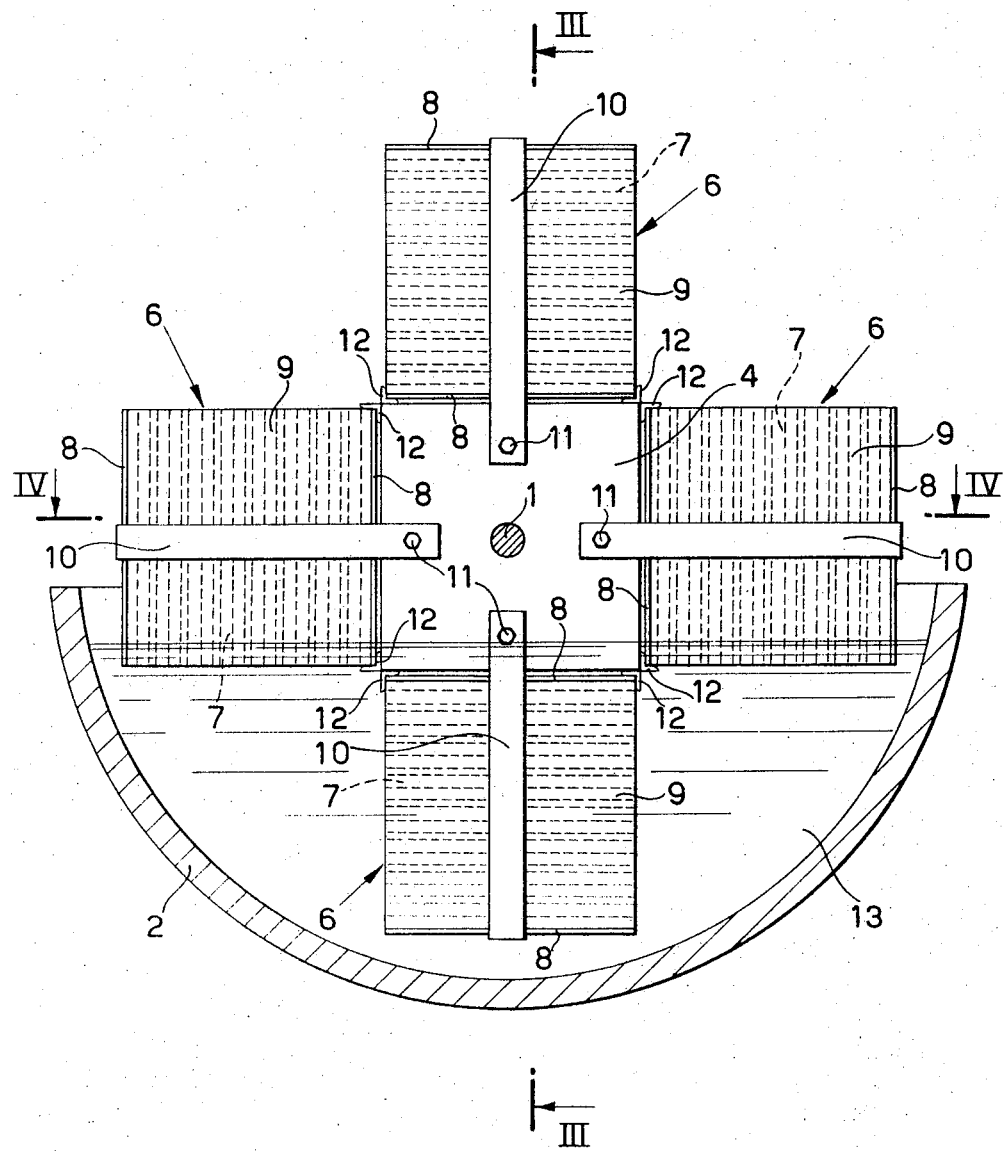
FIG. 1 is a schematic cutaway view of the filter according to the invention and according, in particular, to the line I—I of FIG. 3.
Figure 2:
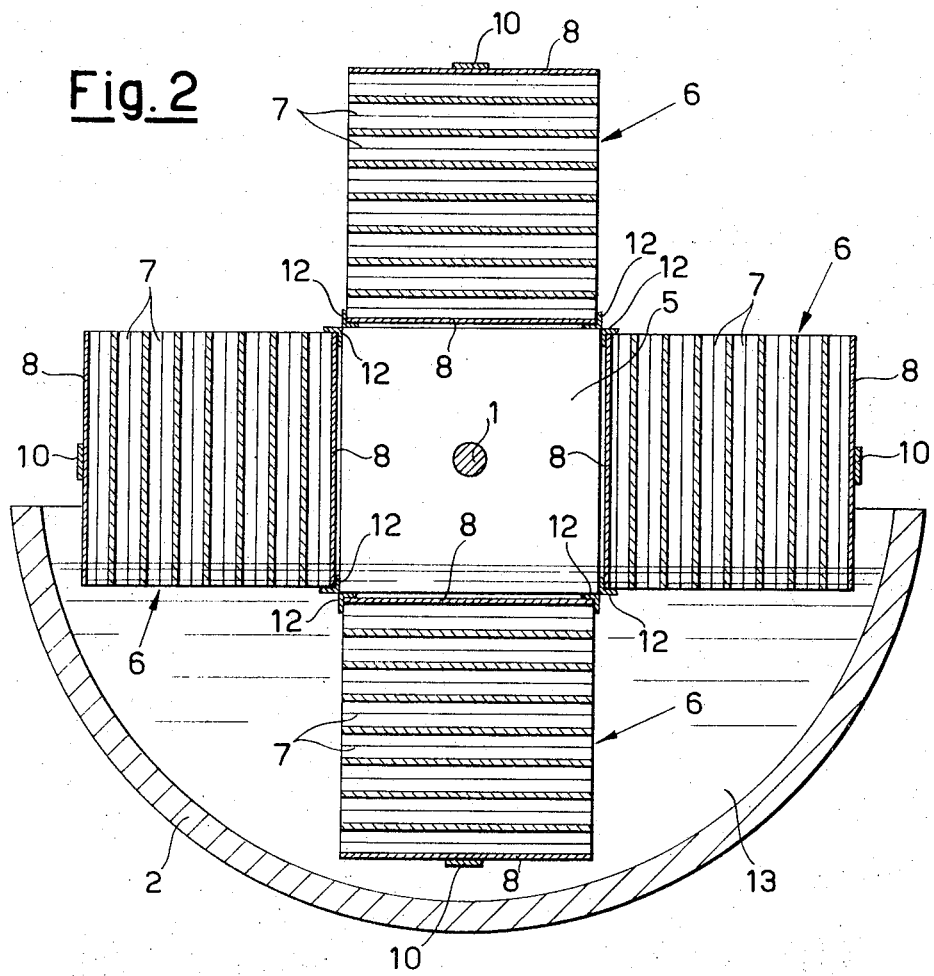
FIG. 2 shows the cross-section of the above-mentioned filter, according to the line II—II of FIG. 3.
Figure 5:
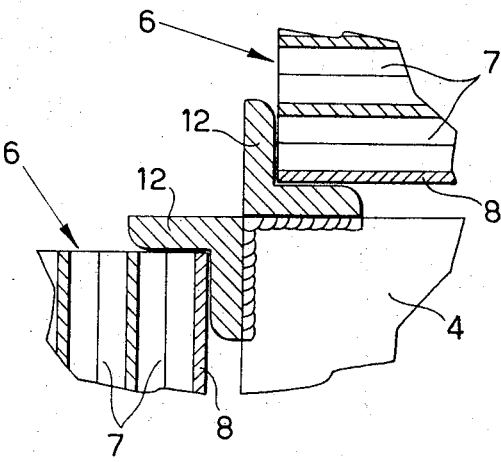
FIG. 5 shows the magnified detail fixing the packs to a common supporting component of the filter as shown in FIGS. 1–4.

The filter, shown in FIGS. 1–5, rotates on a shaft 1 supported by the sides of a tank 2. The rotation of the shaft 1 is due to a moto-reducer 3. On the shaft 1 are fastened by welding two quadrangular plates 4 and one or more intermediate plates 5. The plates 4 and 5 are ranged in such a way that their sides delimite, in their whole, a prismatic space having a quadratic section. Such a prismatic space is closed laterally by four parallelepiped plastic packs 6. Each of these packs 6 consists in a plurality of parallel channels 7 that are open at their extremities. Each pack 6 is wrapped up externally by plates 8 and 9, ranged in a position that is parallel to the channels 7.

The packs 6 are fastened to the external plates 4 by means of rigid straps 10. The straps 10 are fixed to the plates 4 by means of bolts 2. Each pack 6, moreover, is supported by a couple of angles 12, welded to the plates 4 and 5. During the motion, the filter rotates continuously in clockwise or in counterclockwise direction, in such a way that each pack 6 is moving, at each revolution of the filter, periodically first in the wastewater 13 then in the air, but always in the direction corresponding to the development of the channels 7.

During this operation the micro-organisms present in the wastewater adhere to the walls of the channels 7, thereby forming a biologically active film. The micro-organisms feed upon the impurities of the wastewater and oxidize them when in contact of the air. At the same time, under above-mentioned conditions, the micro-organisms multiply rapidly.

The constantly growing excess of the biological film falls by gravity in the bottom of the tank 2. Thus a continuous purification of the wastewater flowing through the tank 2 where the filter rotates takes place.

Figure 6:
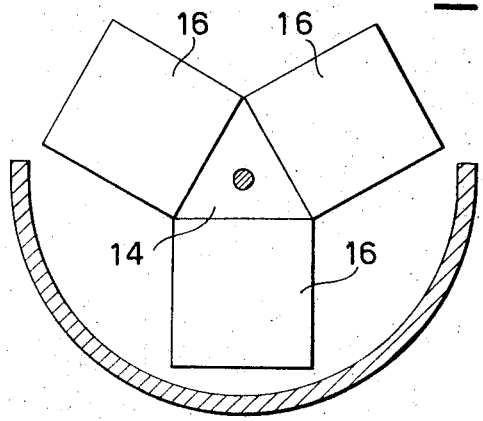
FIGS. 6–10 show schematically some possible variants of the filter as shown in FIGS. 1–5.
Figure 7:
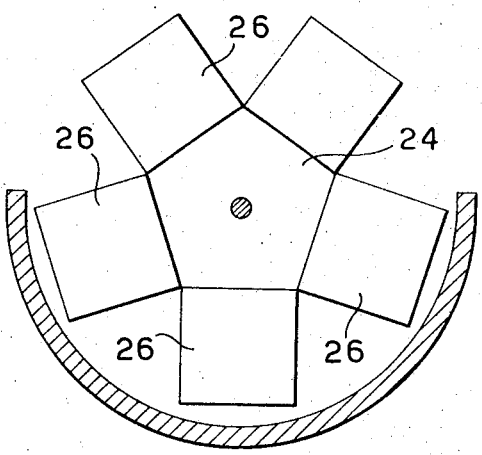
Figure 8:
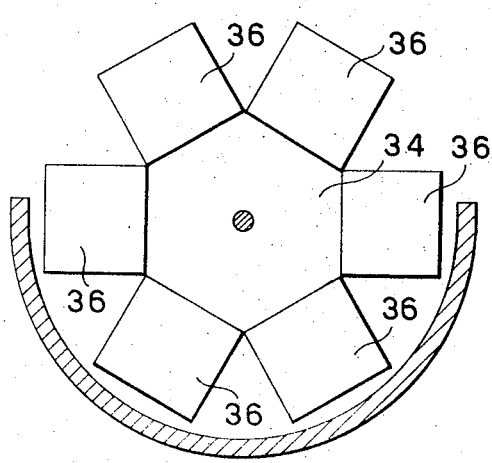
Figure 9:
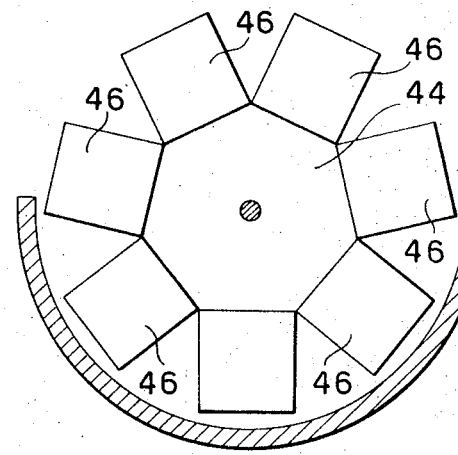
Figure 10:
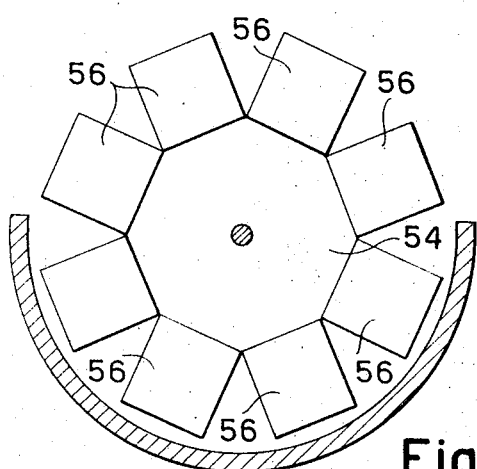

The above-mentioned filter, as shown in FIGS. 1–5, can have different forms, but the main characteristics are always conceptually the same. In particular, while the filter shown in FIGS. 1–5 consists of four packs, arranged in such a way to envelope a prismatic space of quadrangular section delineated by quadratic spacer plates 4 and 5; it is also possible to have filters having three, five, six, seven or eight packs (16, 26, 36, 46, 56), arranged in such a way to envelope some corresponding prismatic, space having either a triangular, pentagonal, hexagonal, heptagonal, or octagonal section respectively (See FIGS. 6–10). These prismatic spaces are delineated by triangular, pentagonal, hexagonal, heptagonal, or octagonal spacer plates (14, 24, 34, 44, 54) respectively.

What I claim is:

1. A rotating filter for wastewater biological purification comprising (a) at least one assembly of parallel open-ended elongated channels, (b) a shaft having an axis of rotation about which said at least one assembly is rotatable, said axis of rotation being perpendicular to said elongated channels, (c) means for rotating said assembly about said axis of rotation, and (d) means connecting said at least one assembly to said shaft for allowing said assembly to be sequentially immersed into and then emersed from said wastewater during rotation.

2. A rotating filter for wastewater biological purification as recited in claim 1 wherein said means connecting said at least one assembly to said shaft includes at least one plate through which said shaft is passed, said plate having at least three edges, one edge for each assembly of parallel open-ended elongated channels.

3. A rotating filter for wastewater biological purification as recited in claim 2 wherein said means connecting said at least one assembly to said shaft further includes at least two said plates which are spaced along said shaft, and strap means having two ends, said strap means surrounding each of said at least one assembly and being attached to said plates at said ends, thereby holding each said assembly against said corresponding edges of said plates.

* * * * *